United States Patent
Galles et al.

(10) Patent No.: US 9,876,842 B2
(45) Date of Patent: *Jan. 23, 2018

(54) OFFLOAD OPERATIONS FOR OVERLAY NETWORKS

(71) Applicant: Cisco Technology, Inc., San Jose, CA (US)

(72) Inventors: Mike Galles, Los Altos, CA (US); Cesare Cantu, Santa Clara, CA (US); Anant Deepak, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,897

(22) Filed: Aug. 29, 2016

(65) Prior Publication Data

US 2016/0373511 A1 Dec. 22, 2016

Related U.S. Application Data

(63) Continuation of application No. 13/855,037, filed on Apr. 2, 2013, now Pat. No. 9,462,088.

(51) Int. Cl.
*H04L 29/08* (2006.01)
*H04L 29/06* (2006.01)

(52) U.S. Cl.
CPC .............. *H04L 67/02* (2013.01); *H04L 69/22* (2013.01)

(58) Field of Classification Search
CPC ................................. H04L 67/02; H04L 69/22
See application file for complete search history.

(56) References Cited

U.S. PATENT DOCUMENTS

| 7,949,792 | B2 | 5/2011 | Kujk et al. |
| 8,156,230 | B2 | 4/2012 | Bakke et al. |
| 8,300,641 | B1 | 10/2012 | Vincent et al. |
| 8,428,087 | B1 | 4/2013 | Vincent |
| 8,830,834 | B2 * | 9/2014 | Sharma .................. H04L 45/64 370/235 |
| 8,982,707 | B2 | 3/2015 | Moreno et al. |
| 9,197,551 | B2 * | 11/2015 | DeCusatis ............... H04L 45/52 |
| 2004/0087309 | A1 | 5/2004 | Joshi et al. |
| 2007/0160017 | A1 | 7/2007 | Meier et al. |
| 2008/0155537 | A1 | 6/2008 | Dinda et al. |
| 2009/0010533 | A1 | 1/2009 | Hung |

(Continued)

OTHER PUBLICATIONS

B. Yi, B. Congxiao and L. Xing, "FlowLAN: A non-tunneling distributed virtual network based on IPv6," 2016 IEEE Information Technology, Networking, Electronic and Automation Control Conference, Chongqing, 2016, pp. 229-234. doi: 10.1109/ITNEC.2016.7560355.*

(Continued)

*Primary Examiner* — Kostas Katsikis
(74) *Attorney, Agent, or Firm* — Edell, Shapiro & Finnan, LLC

(57) ABSTRACT

Techniques are presented herein for receipt/transmission of packets to/from a host via a connected input/output (IO) device. In general, a packet is associated with a payload, an inner packet header, and an outer overlay header. The IO device is configured to perform independent offload operations on the inner packet header and the outer overlay header.

17 Claims, 6 Drawing Sheets

(56) References Cited

U.S. PATENT DOCUMENTS

| | | |
|---|---|---|
| 2011/0002228 A1 | 1/2011 | Pepper et al. |
| 2011/0255540 A1 | 10/2011 | Mizrahi et al. |
| 2012/0250682 A1 | 10/2012 | Vincent et al. |
| 2012/0250686 A1 | 10/2012 | Vincent et al. |
| 2013/0163594 A1* | 6/2013 | Sharma .................. H04L 45/64 370/392 |
| 2013/0322446 A1 | 12/2013 | Biswas et al. |
| 2014/0050091 A1 | 2/2014 | Biswas et al. |
| 2014/0050218 A1 | 2/2014 | Kamble et al. |
| 2014/0056151 A1 | 2/2014 | Petrus et al. |
| 2014/0059537 A1 | 2/2014 | Kamble et al. |
| 2014/0201390 A1 | 7/2014 | Dalal et al. |
| 2014/0201733 A1 | 7/2014 | Benny et al. |
| 2014/0207968 A1 | 7/2014 | Kumar et al. |
| 2014/0211623 A1 | 7/2014 | Choi et al. |
| 2014/0269321 A1 | 9/2014 | Kamble et al. |
| 2014/0269705 A1 | 9/2014 | DeCusatis et al. |
| 2014/0269712 A1 | 9/2014 | Kidambi |
| 2014/0297785 A1 | 10/2014 | Galles et al. |

OTHER PUBLICATIONS

Koponen, T., Amidon, K., Balland, P., Casado, M., Chanda, A., Fulton, B., . . . & Lambeth, A. (Apr. 2014). Network Virtualization in Multi-tenant Datacenters. In NSDI (vol. 14, pp. 203-216).*
Davie, et al., "A Stateless Transport Tunneling Protocol for Network Virtualization (STT)," Network Working Group, Internet-Draft, Mar. 5, 2012, pp. 1-19.

* cited by examiner

OFFLOAD OPERATIONS FOR OVERLAY NETWORKS

CROSS REFERENCE TO RELATED APPLICATION

This application is a continuation of U.S. application Ser. No. 13/855,037, filed Apr. 2, 2013, the entirety of which is incorporated herein by reference.

TECHNICAL FIELD

The present disclosure relates generally to offload operations of an input/output device.

BACKGROUND

Enterprise computing environments may include hosts (e.g., servers, computers, etc.) running one or more processes, such as virtual machines. The hosts and/or processes may be configured to communicate with other processes or devices over a computing network. The hosts interface with the computing network via input/output (IO) devices (e.g., network interface cards (NICs)).

Enterprise computing environments may take a number of different forms and continue to grow in scale, complexity, and connectivity. Virtualization technologies have been introduced to facilitate operation of enterprise computing environments in ways that address such issues.

DESCRIPTION OF EXAMPLE EMBODIMENTS

Overview

Figure 1:
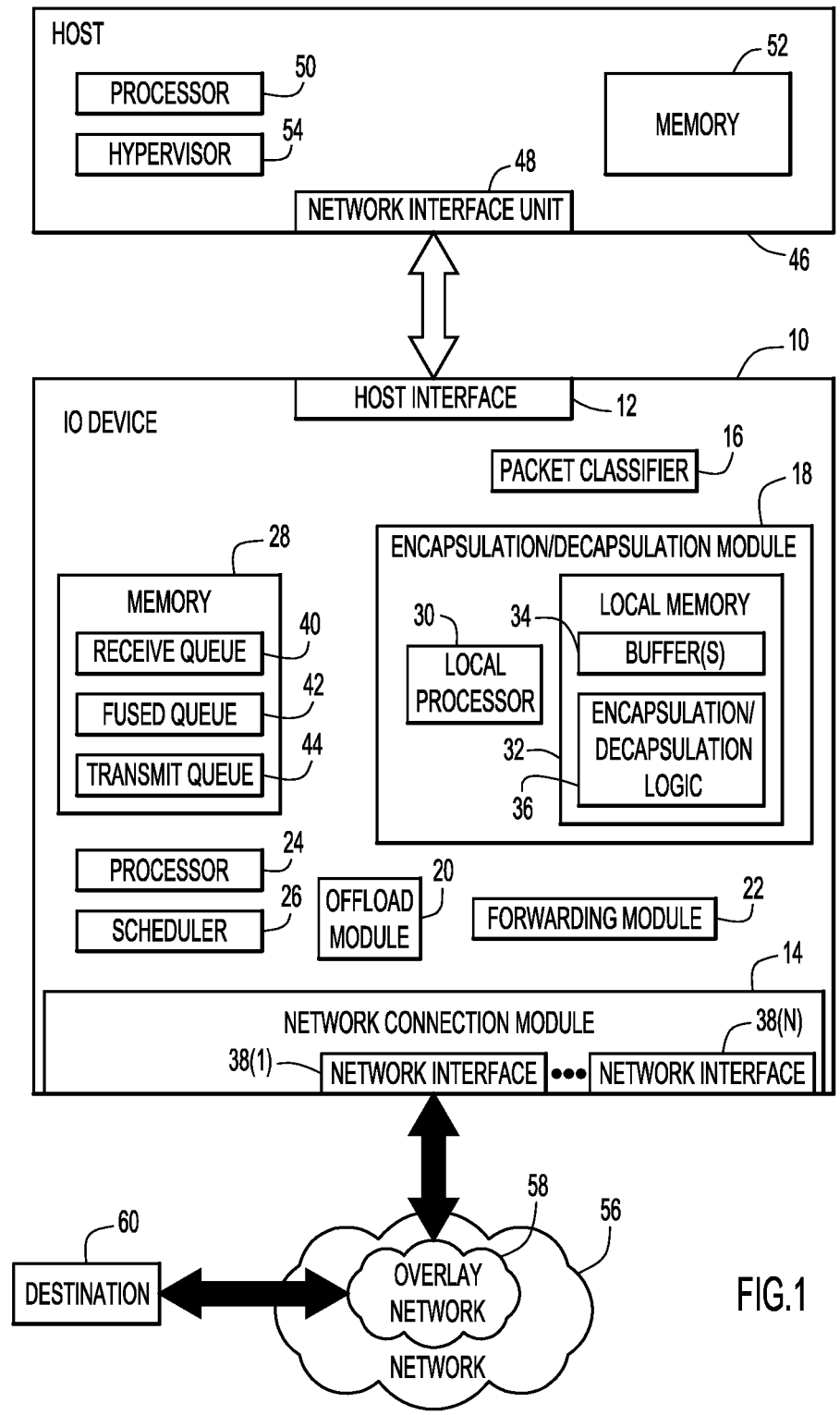
FIG. 1 is a block diagram of an IO device configured to perform offload operations for overlay packets in accordance with examples presented herein.

Techniques are presented herein for receipt/transmission of packets to/from a host via a connected input/output (IO) device. In general, a packet is associated with a payload, an inner packet header, and an outer overlay header. The IO device is configured to perform independent offload operations on the inner packet header and the outer overlay header.

Example Embodiments

In computing networks, data is transmitted from a source to a destination in the form of packets (sometimes referred to as datagrams, segments, blocks, cells or frames) according to predefined protocols (e.g., the Transmission Control Protocol/Internet Protocol (TCP/IP), the User Datagram Protocol (UDP), the Generic Routing Encapsulation (GRE) protocol, etc.). Packets generally comprise control information and actual data, referred to herein as payload. The control information is data that intermediate network devices (e.g., switches, routers, etc.) use to forward the packet from the source to the destination. The control information may comprise, for example, source and destination addresses (e.g., source and destination Media Access Control (MAC) addresses), error detection codes (i.e., checksums), sequencing information, etc. This control information is generally found in a portion of the packet referred to as the packet header (i.e., the information that generally precedes the actual data within the packet).

Increases in size and complexity have led to the proliferation of virtualization in computing environments. In particular, hypervisors (sometimes referred to as virtual machine managers or virtualization managers) are now expanding into the networking domain to build overlay networks that, in general, provide improved manageability, scalability, and control. An overlay network is a virtual layer that is built on the top of an underlying computing network so as to link two devices via one or more virtual path segments. As used herein, a virtual path segment is an overlay connection between two overlay "hops" (i.e., overlay network devices) in the service path.

A packet on an overlay network, referred to as an overlay packet, includes a payload and two separate headers, namely an outer overlay header and an inner packet header. The inner packet header and the payload are collectively referred to herein as an inner packet. The inner packet is a fully formed packet with, for example, Layer 2 (L2), Layer 3 (L3), and possibly Layer 4 (L4) data. The inner packet header may be generated in accordance with TCP, UDP, GRE, etc. The inner packet is, in general, the packet that a host or a guest operating system (e.g., virtual machine) on the host attempts to send to a destination. The outer overlay header is a second layer of encapsulation that is added to (e.g., pre-pended to) the inner packet. The outer overlay header is information that is used by the overlay network devices to forward the inner packet to the destination.

Hypervisor vendors have independently defined different protocols and encapsulation schemes for overlay networks. Due to the differences between these protocols and encapsulation schemes, conventional IO devices (e.g., network interface cards (NICs)) are unable to provide common offload operations, such as TCP Segmentation Offload (TSO), checksum offloads (e.g., header checksum generation for Internet Protocol (IP) and TCP/UDP headers), packet padding, frame check sequence (FCS) generation, etc. for overlay packets. More specifically, the different overlay protocols are in nascent stages of development and are not pervasive enough for vendors of IO devices to add specialized hardware to provide offload operations for each different encapsulation scheme.

Because conventional IO devices are unable to provide offloads for overlay packets, the general solution has been for the hypervisors themselves to perform the offload operations in software. However, the use of the hypervisor to perform the offload operations takes away processing cycles for networking, virtual machines, etc., and is a general detriment to hypervisor performance.

Presented herein are techniques that enable an IO device, such as a NIC, to perform offload operations for overlay packets regardless of the overlay encapsulation utilized by the hypervisor. In other words, the IO device is configured to perform the offload operations in an encapsulation-generic manner without introducing any specialized hardware for different particular encapsulation formats. As described further below, the IO device processes an inner packet header and an outer overlay header in an overlay packet as separate and independent (i.e., unrelated) entities.

FIG. 1 is a block diagram of an IO device 10 configured to perform offload operations for overlay packets in accordance with examples presented herein. In one form, IO device 10 is implemented as a rack mounted device and comprises one or more Application Specific Integrated Circuits (ASICs) and/or boards with components mounted thereon.

As shown, the IO device 10 includes a host interface 12 and a network connection module 14. The host interface 12 is configured to provide communication link(s) with one or more hosts (e.g., host servers) 46. For ease of illustration, only one host 46 is shown in FIG. 1. Host 46 comprises a network interface unit 48 that communicates with host interface 12, a processor 50, a memory 52, and a hypervisor 54. The hypervisor 54 may be implemented in any combination of hardware, software, and firmware.

The network connection module 14 comprises a plurality of network interfaces 38(1)-38(N). In one form, network interfaces 38(1)-38(N) are Gigabit Serial Electrical Interfaces (XFI interfaces). These interfaces support 10 Gigabit Ethernet (GE) port channel, or 40 GE when bundled into groups of four interfaces. Each interface 38(1)-38(N) may also support Serial Gigabit Media Independent Interface (SGMII) transfer at 1 GE speed.

The IO device 10 also comprises a packet classifier 16, an encapsulation/decapsulation module 18, an offload module 20, a forwarding module 22, a processor 24, a scheduler 26, and a memory 28. The packet classifier 16, offload module 20, and forwarding module 22 are, in the example of FIG. 1, implemented as hardware elements (e.g., dedicated or multi-purpose hardware) in the IO device 10. The encapsulation/decapsulation module 18 comprises a local processor 30, and a local memory 32. Local memory 32 includes one or more buffers 34 and encapsulation/decapsulation logic 36. Encapsulation/decapsulation logic 36 comprises instructions stored in local memory 32 that are executable by local processor 30. As such, the encapsulation/decapsulation module 18 of FIG. 1 is partially implemented in software.

IO device 10 may also include a separate SGMII port (not shown) configured to connect to a Baseboard Management Controller (BMC) interface (also not shown) of host server 46. IO device 10 may also include other interfaces, such as a 16-bit parallel flash interface, a Serial Peripheral Interface (SPI), two wire (I²C) interface, universal asynchronous receiver/transmitter (UART), Management Data IO (MDIO) interface, General Purpose IO interface (GPIO), and/or Joint Test Action Group (JTAG) interface. Such interfaces are options for different forms of IO device 10, and, for ease of illustration, have not been included in FIG. 1.

Memory 28 comprises one or more receive queues (Rx queues) 40, one or more fused queues 42, and one or more transmit queues (Tx queues) 44. Memory 28 may be in the form of double data rate type three synchronous dynamic random access memory (DDR3 SDRAM) having a high bandwidth interface (e.g., 4 GB max capacity) that may be used for, as an example, burst packet buffering, management protocols, PCIe configuration and virtualization structures, exchange table management, flow tables, and other control structures.

In certain examples, memory 28, local memory 32, and memory 52 may comprise read only memory (ROM), random access memory (RAM), magnetic disk storage media devices, optical storage media devices, flash memory devices, electrical, optical, or other physical/tangible memory storage devices. The processors 24, 30, and 50 are, for example, microprocessors or microcontrollers that execute instructions stored in the respective memory. Thus, in general, the memory 28, the local memory 32, and the memory 52 may each comprise one or more tangible (non-transitory) computer readable storage media (e.g., a memory device) encoded with software comprising computer executable instructions.

The network interfaces 38(1)-38(N) enable network connections or uplinks with a computing network 56 that may be, for example, a local area network, wide area network, etc. In this example, an overlay network 58 is also provided that runs on top of the computing network 56. More specifically, the hypervisor 54 on host 46 is configured to transmit overlay packets on the overlay network 58 to a destination 60 via IO device 10. Similarly, the hypervisor 54 is configured to receive overlay packets on the overlay network via IO device 10. Destination 60 may be, for example, a computer, server, virtual machine, etc.

Figure 2:
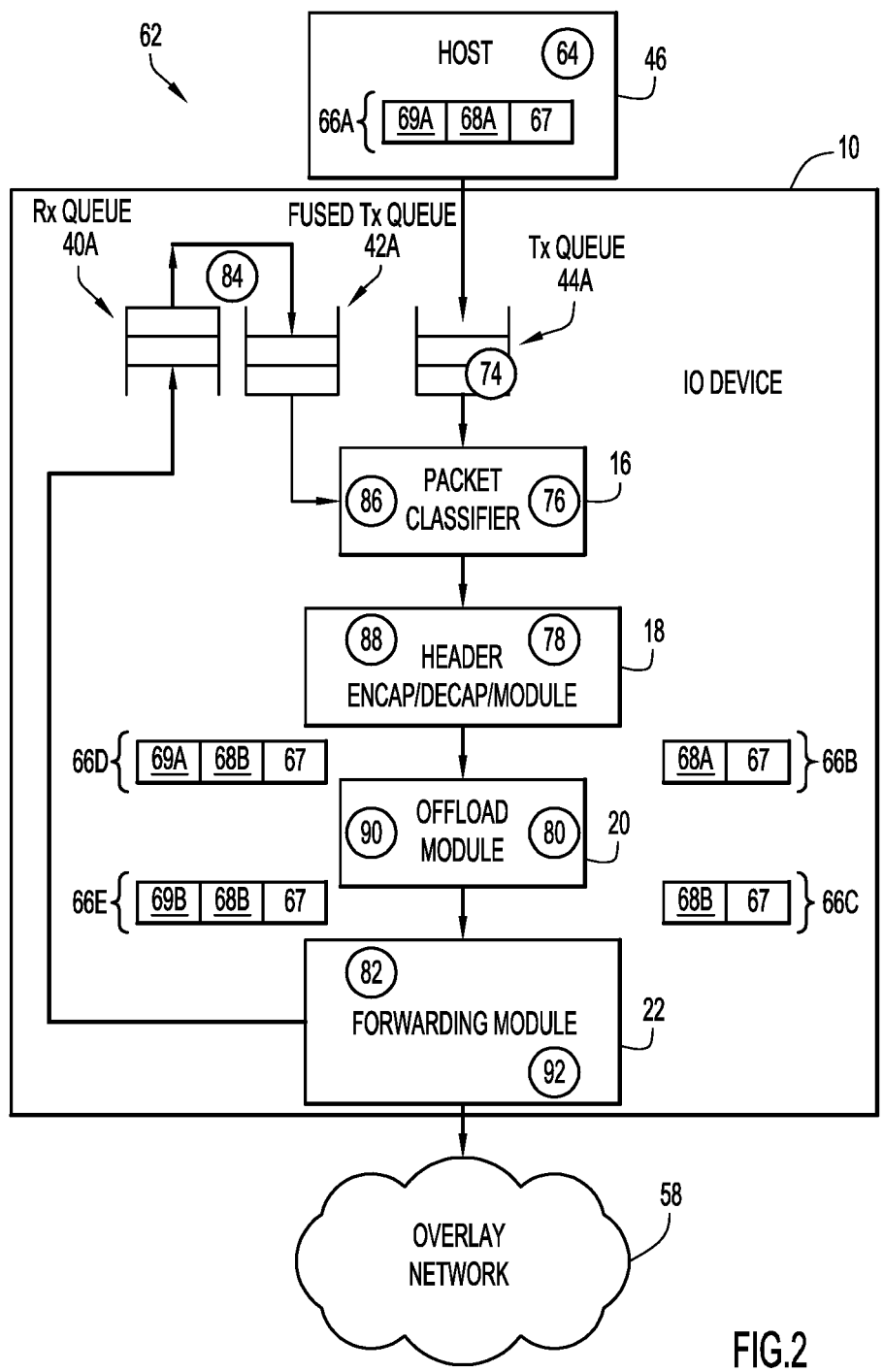
FIG. 2 is a schematic flow diagram illustrating the transmission of a packet via an IO device in accordance with examples presented herein.

FIG. 2 is a schematic flow diagram illustrating a method for transmission of an overlay packet on an overlay network via an IO device. For ease of illustration, the method of FIG. 2 will be described with reference to the arrangement of FIG. 1.

The method 62 of FIG. 2 begins at 64 where the host 46 (e.g., a guest operating system executed on the host and/or a hypervisor) creates (builds) a packet 66A for transmission on overlay network 58. The packet 66A is associated with a payload 67 and a dual-layer of encapsulation, namely an inner packet header 68A (generated in accordance with a standard networking protocol) and an outer overlay header 69A (generated in accordance with an overlay protocol). In the example of FIG. 2, the packet 66A created by host 46 is not a complete packet ready for transmission on overlay network 58. Instead, both the inner packet header 68A and the outer overlay header 69A may have fields that are to be completed (i.e., generated, replaced, or added to) through offload operations of the IO device 10. That is, the inner packet header 68A and the outer overlay header 69A are "incomplete" headers.

In certain examples, the outer overlay header 69A is not created by the host 46, but instead is entirely generated by the IO device 10. For example, no hypervisor may be present in host 46 to generate the outer overlay header or the overlay network 58 may be created by the network hardware itself (i.e., by the IO device) rather than through hypervisor software. In such examples, the host operating system sends a standard packet with a single header and the outer overlay header comes from, for example, a Software Defined Network (SDN) flow rule which applies a particular outer overlay header encapsulation to a particular flow or set of flows. These flows and outer overlay headers are stored in classification tables and memory buffers of the IO device 10. As such, as used herein, an "incomplete header" may mean a header that has one or more blank fields or values, a header that includes default fields or values that are to be modified prior to transmission, or a header that is entirely missing (i.e., not provided by the host and is to be generated by the IO device 10).

At 74, the packet 66A is added to a transmit (Tx) queue 44A of the IO device 10 from host memory 52 through, for example, a direct memory access (DMA) or a scatter-gather operation (FIG. 1). In accordance examples presented herein, a number of different packets from different hosts may be transmitted by the IO device 10. For example, packets obtained by the IO device 10 may be completed non-overlay packets (i.e., packets for transmission on the network 56 that should not subject to offload operations), incomplete non-overlay packets (i.e., packets for transmission on the network 56 that should be subject to offload operations), or incomplete overlay packets (such as packet 66A). Accordingly, at 76 the packet classifier 16 evaluates the packet 66A to determine if offload operations should be applied. In this example, packet 66A is classified as an overlay packet having dual-encapsulation.

A number of different methods may be utilized by packet classifier 16 to determine if a packet is an overlay packet. In one example, the interface with the host 46 may be pre-designated for use on the overlay network. As such, any packet received at the interface will be known to be an overlay packet. Alternatively, a packet header may include a type-identifier that is used by the classifier to determine if a packet is an overlay packet.

The packet classifier 16 also marks or tags the packet 66A for loopback processing. For example, metadata which is not part of the packet may be carried with the packet during processing by the IO device 10. The packet classifier 16 may modify this metadata to include a loopback indicator.

At 78, the header encapsulation/decapsulation module 18 removes the incomplete outer overlay header 69A. The incomplete outer overlay header 69A may be stored in a local buffer 34 (FIG. 1) of the encapsulation/decapsulation module 18 or opaquely attached to the packet (i.e., marked to be ignored). In operation, the local processor 30 (FIG. 1) executes instructions in encapsulation/decapsulation logic 36 (FIG. 1) to remove and store the outer overlay header 69A. The modified packet from which the outer overlay header 69A has been removed is shown in FIG. 2 as packet 66B. Packet 66B includes the payload 67, the incomplete inner packet header 68A, and, optionally, the opaque version of incomplete outer overlay header 69A.

At 80, the offload module 20 performs one or more offload operations to complete the inner packet header 68A. That is, at 80, a first pass through the offload module 20 is performed to complete the inner packet header 68A. As noted above, these offload operations may include a TSO, a header checksum offload, etc. In FIG. 2, the packet after the offload operations is shown as packet 66C and includes the payload 67 and a complete inner packet header 68B.

At 82, the forwarding module 22 determines that packet 66C is not ready for transmission on overlay network 58. As such, instead of sending the packet out on the overlay network 58 (or network 56), the forwarding module sends the packet 66C to a receive queue 40A (i.e., the packet is looped back to a receive queue). The receive queue 40A is fused to a second transmission queue that is referred to herein as a fused transmission queue (fused Tx queue) 42A (i.e., a transmission queue that is separate from transmission queue 44A and which is fused to the receive queue 40A). As noted above, the metadata carried with the packet may include a loopback indicator. This loopback indicator is used by the forwarding module 22 to determine whether the packet 66C should be sent to the receive queue 40A instead of transmitted on the network.

At 84, the packet 66C is recognized as a loopback packet (usually because of a particular interface) and the packet 66C is sent from the fused transmission queue 42A to the packet classifier 16. At 86, the packet classifier 16 marks the packet 66C for outer overlay header encapsulation and transmission. For example, a flag may be set in the metadata indicating to the forwarding module 22 that the packet should be transmitted on the overlay network and/or the loopback indicator may be cleared. The packet 66C is then provided to the header encapsulation/decapsulation module 18.

At 88, the original outer overlay header 69A is recovered from the local buffer 34 (or from the packet 66C) and pre-pended to (added to the front end of) the packet 66C. In other words, the packet 66C is encapsulated to include the incomplete outer overlay header 69C. In FIG. 2, the packet after these encapsulation operations is shown as packet 66D and includes the payload 67, the complete inner packet header 68B, and the incomplete outer overlay header 69A.

At 90, the offload module 20 performs one or more offload operations to complete the outer overlay header 69A while ignoring the inner packet header 68B. That is, at 90, a second pass through the offload module 20 is performed to complete the outer overlay header 69A. As noted above, these offload operations may include a TSO, a header checksum offload, etc. In FIG. 2, the packet after the offload operations is shown as packet 66E and includes the payload 67, the complete inner packet header 68B, and a complete outer overlay header 69B. At 92, the forwarding module 22 transmits the final packet 66E according to outer overlay header forwarding rules on the overlay network 58.

Figure 3:
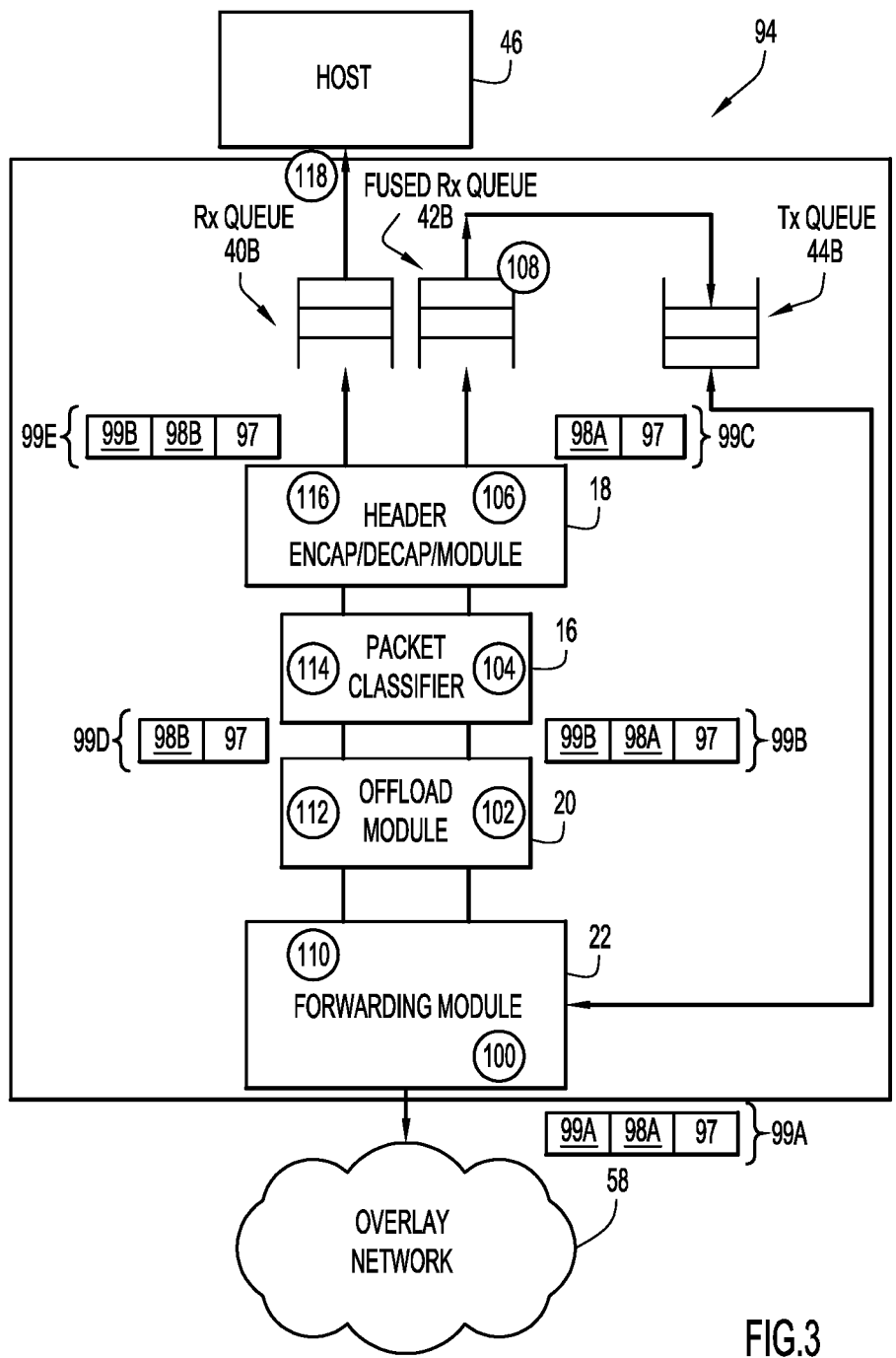
FIG. 3 is a schematic flow diagram illustrating the receipt of a packet via an IO device in accordance with examples presented herein.

FIG. 3 is a schematic flow diagram illustrating a method for receiving an overlay packet on an overlay network via an IO device. The method of FIG. 3 will be described with reference to the arrangement of FIG. 1.

The method 94 of FIG. 3 begins at 100 where an overlay packet 96A that includes a payload 97 and a dual-layer of encapsulation, namely an inner packet header 98A (generated in accordance with a standard networking protocol) and an outer overlay header 99A (generated in accordance with an overlay protocol) is received on a networking port and forwarded by forwarding module 22 towards an interface of host 46. In the example of FIG. 3, both of the inner packet header 98A and the outer overlay header 99A may have fields that are to be processed through offload operations of the IO device 10.

At 102, the offload module 20 performs one or more offloads on the outer overlay header 99A to generate outer header offload data for use by the host 46. That is, at 102, a first pass through the offload module 20 is performed to process the outer overlay header 99A. As noted above, these offloads may include, for example, a header checksum offload or other offloads. In FIG. 3, the packet after the offload operations is shown as packet 96B and includes the payload 97, an outer overlay header 99B (i.e., the outer overlay header after offload), and an inner packet header 98A. The packet 96B is then provided to packet classifier 16.

At 104, the packet classifier 16 evaluates the packet 96B to determine if additional offload operations should be applied to the packet. In this example, packet 96B is classified as an overlay packet (dual-encapsulation) that needs additional offload operations on inner packet header 98A. A number of different methods may be utilized by packet classifier 16 to determine if a packet is an overlay packet. In one example, a packet header may include a type-identifier that is used by the packet classifier 16 to determine if a packet is an overlay packet.

Additionally, the packet classifier 16 marks or tags the packet 96B for loopback processing. For example, metadata which is not part of the packet may be carried with the packet during processing by the IO device 10. The packet classifier 16 may modify this metadata to include a loopback indicator.

At 106, the header encapsulation/decapsulation module 18 removes the outer overlay header 99B. The outer overlay header 99B may be stored in a local buffer 34 (FIG. 1) of the encapsulation/decapsulation module 18 or opaquely attached to the packet (i.e., marked to be ignored). In operation, the local processor 30 (FIG. 1) executes instructions in encapsulation/decapsulation logic 36 (FIG. 1) to remove and store the outer overlay header 99B. The modified packet from which the outer overlay header 99B has been removed is shown in FIG. 3 as packet 96C. Packet 96C includes the payload 97, the inner packet header 98A, and, optionally, the opaque version of outer overlay header 99B.

At 108, the packet 96C is sent to a receive queue, referred to herein as a fused receive queue 42B, that is fused to a local transmit queue 44B. The packet 96C is recognized as a loopback packet (usually because of a particular interface) and the packet 96C is sent back to the forwarding module 22. At 110, the forwarding module 22 recognizes the inner packet header 98A and/or the loopback indicator and the packet 96C is sent to the offload module 20.

At 112, the offload module 20 performs one or more offloads on the inner packet header 98A to generate inner header offload data for use by host 46. That is, at 112, a second pass through the offload module 20 is performed to process the inner packet header 98A. As noted above, these offloads may include, for example, a header checksum offload or other offloads. In FIG. 3, the packet after the offload operations is shown as packet 96D and includes the payload 97 and an inner packet header 98B (i.e., the inner packet header after offload). The packet 96D is then provided to packet classifier 16.

At 114, the packet 96D is classified as having been decapsulated and is marked for re-encapsulation. At 116, the outer overlay header 99B is recovered from the local buffer 34 (or from the packet 96D) and pre-pended to (added to the front end of) the packet 96D. In other words, the packet 96D is encapsulated to include the outer overlay header 99B. In FIG. 3, the packet after these encapsulation operations is shown as packet 96E and includes the payload 97, the inner packet header 98B, and the outer overlay header 99B.

At 118, the complete packet 96E is added to a host receive queue from a receive queue 40B via, for example, a DMA or a scatter-gather operation. An indication of whether the inner and/or outer overlay header offloads were successful and the inner and outer header offload data may also be added to the same or a different host receive queue.

In the examples of FIGS. 2 and 3, the interface between the IO device 10 and the host 46 is a single queue. For example, during the transmission operations of FIG. 2, the inner packet header and the outer overlay header are added to the same transmission queue (e.g., the entire packet with inner packet and outer overlay headers is sent to the IO device 10 as a single monolithic packet). Similarly, during the receiving operations of FIG. 3, the inner packet header and the outer overlay header are added to the same receive queue. It is to be appreciated that these single queue implementation of FIGS. 2 and 3 are merely examples and other implementations are possible.

For example, in one alternative arrangement the interface between the IO device 10 and the host 46 may comprise at least two queues. In such examples, the host 46 splits the packet before it is obtained by the IO device 10 for transmission such that the inner packet header will be provided to a first queue and the outer overlay header is provided to a second queue. Similarly, the IO device 10 is configured to split a received and processed packet before delivery to the host 46 such that the inner packet header will be provided to a first queue and the outer overlay header is provided to a second queue.

The operations of the IO device 10 to transmit and/or receive a packet in examples where at least two queues are used as the interface between the IO device 10 and the host 46 may be similar to the operations described above with reference to FIGS. 2 and 3. In particular, the operations are such that the inner packet header and the outer overlay header are recursively subject to independent and separate offload operations by the IO device 10. That is, a similar loopback mechanism as described above may be utilized to process the inner packet header and the outer overlay header as independent entities.

As noted above, the techniques presented herein generally enable an IO device to perform offload operations for overlay packets regardless of the overlay encapsulation utilized by the hypervisor. In other words, the IO device is configured to perform the offload operations in an encapsulation-generic manner without introducing any specialized hardware for different particular encapsulation formats. The loopback mechanism of FIGS. 2 and 3 that provides for recursive processing of the inner packet header and the outer overlay header is one example in which the techniques may be implemented to achieve the independent processing of the two headers. It is to be appreciated that other mechanisms may be implemented to process an inner packet header and an outer overlay header as separate and independent entities.

Figure 4:
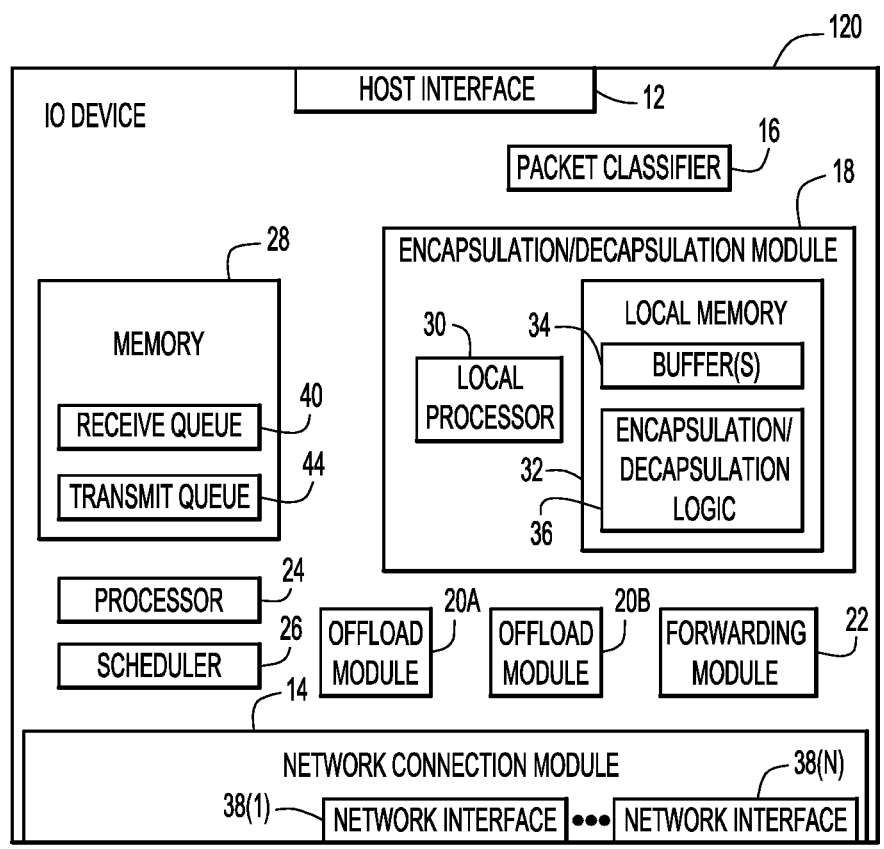
FIG. 4 is a block diagram of an IO device configured to perform offload operations for overlay packets in accordance with examples presented herein.

For example, in an alternative arrangement an IO device may include two offload modules that are each configured to perform offload operations on one of the inner packet header and the outer overlay header substantially in parallel. FIG. 4 is a block diagram of an IO device 120 configured to perform parallel offload operations in accordance with examples presented herein.

IO device 120 of FIG. 4 is substantially similar to IO device 10 of FIG. 1. However, in contrast to IO device 10, IO device 120 includes a first offload module 20A and a second offload module 20B. First and second offload modules 20A and 20B may be implemented as separate hardware elements (e.g., dedicated or multi-purpose hardware) in the IO device 120. In operation, instead of performing recursive offload operations (as described above) the inner packet header of a packet is subject to offload operations by one of the offload modules, such as offload module 20A. Substantially in parallel, the outer overlay header is subject to offload operations by the other offload module 20B. In this manner, the inner packet header and the outer overlay header are processed independently by the IO device 120.

In the implementation of FIG. 4, loopback processing is not used to perform the separate offloads of the outer overlay header and the inner packet header (i.e., they are processed in parallel). As such, the fused queues used for loopback processing may be omitted from IO device 120.

Figure 5:
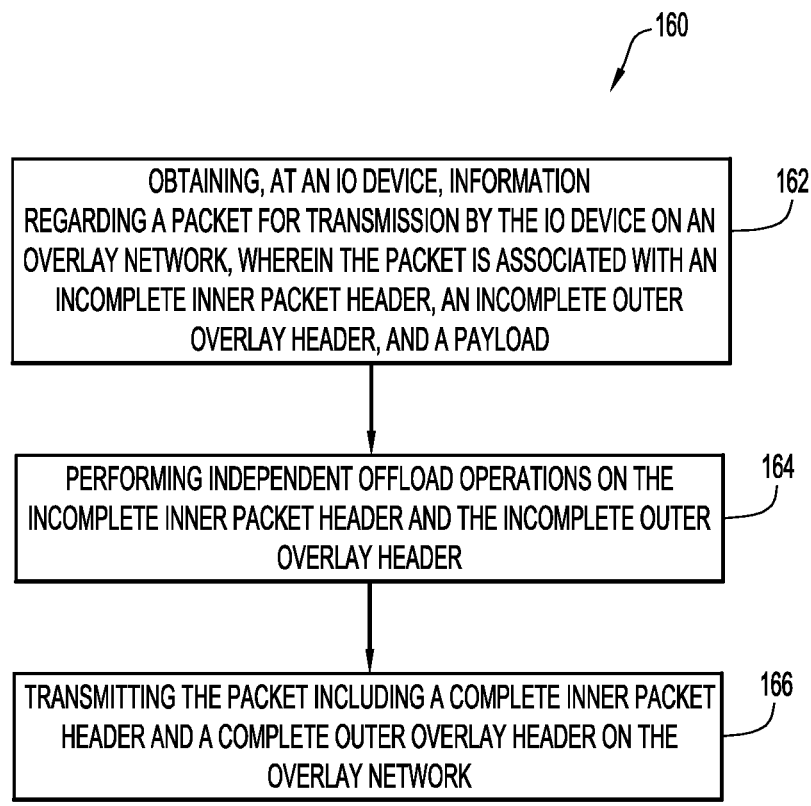
FIG. 5 is a high-level flowchart of a method in accordance with examples presented herein.

FIG. 5 is a high-level flowchart of a method 160 in accordance with examples presented herein. Method 160 begins at 162 where an IO device obtains information regarding a packet for transmission by the IO device on an overlay network. The packet is associated with an incomplete inner packet header, an incomplete outer overlay header, and a payload. At 164, independent offload operations are performed on both the incomplete inner packet header and the incomplete outer overlay header. At 166, the packet, including a complete inner packet header and a complete outer overlay header, are transmitted on the overlay network.

Figure 6:
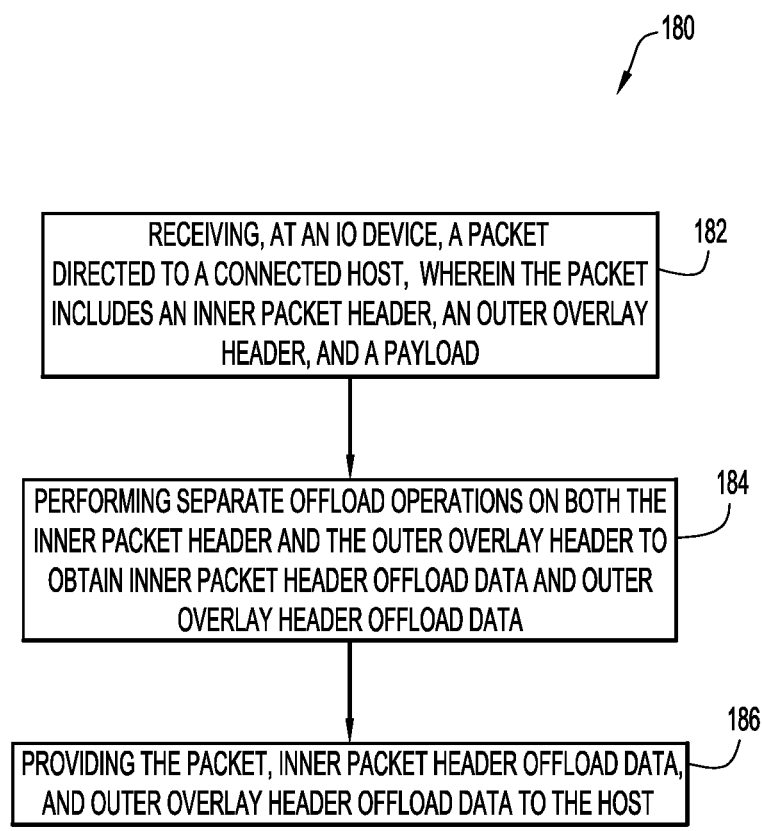
FIG. 6 is a high-level flowchart of a method in accordance with examples presented herein.

FIG. 6 is a high-level flowchart of a method 180 in accordance with examples presented herein. Method 180 begins at 182 where an IO device receives a packet on an overlay network directed to a connected host. The packet includes an inner packet header, an outer overlay header, and a payload. At 184, independent offload operations are performed on the inner packet header and the outer overlay header to obtain inner packet header offload data and outer overlay header offload data. At 186, the packet, inner packet header offload data, and outer overlay header offload data to the host.

As noted above, the techniques presented herein generally enable an IO device to perform offload operations for overlay packets regardless of the overlay encapsulation utilized by the hypervisor. As such, the techniques provide a generic solution for an IO device such as a NIC to provide stateless offloads for inner packet headers and outer overlay headers in any overlay network design and packet encapsulation scheme with minor generic support from the NIC design and a slightly modified model for the host/hypervisor device driver (e.g., the techniques may use no packet format specific technology in the NIC design).

The above description is intended by way of example only.

What is claimed is:

1. A method comprising:
   obtaining, at an input/output (IO) device that comprises at least one offload module, information regarding a packet for transmission by the IO device on an overlay network, wherein the packet is associated with an incomplete inner packet header, an incomplete outer overlay header, and a payload, and wherein obtaining comprises obtaining only the payload and the incomplete inner packet header with no outer overlay header; and
   independently performing offload operations on the incomplete inner packet header and the incomplete outer overlay header by:
      performing a first pass through the at least one offload module of the IO device to complete the inner packet header;
      performing a second pass through the at least one offload module of the IO device to generate the outer overlay header;
      separating the incomplete outer overlay header from the incomplete inner packet header and the payload before performing the first pass through the at least one offload module;
      after performing the first pass through the at least one offload module, returning the complete inner packet header and the payload to a receive queue; and
      pre-pending the incomplete outer overlay header to the complete inner packet header and the payload before performing the second pass through the at least one offload module of the IO device.

2. The method of claim 1, further comprising:
   transmitting on the overlay network, the packet including a complete inner packet header, a complete outer overlay header and the payload.

3. The method of claim 1, wherein independently performing offload operations comprises:
   processing the incomplete inner packet header and the incomplete outer overlay header as independent entities by the IO device.

4. The method of claim 1, wherein obtaining the information regarding the packet for transmission by the IO device comprises:
   adding the incomplete inner packet header and the incomplete outer overlay header to two separate transmission queues of the IO device.

5. The method of claim 1, wherein the at least one offload module comprises first and second offload modules, and the independently performing offload operations comprises:
   performing, at the first and second offload modules, offload operations on both the inner packet header and the outer overlay header substantially in parallel to complete the inner packet header and the outer overlay header.

6. The method of claim 1, wherein obtaining the information regarding the packet for transmission by the IO device comprises:
   adding the incomplete inner packet header and the incomplete outer overlay header to a single transmission queue of the IO device.

7. One or more non-transitory computer readable storage media comprising instructions that, when executed by at least one processor, cause the processor to perform operations comprising:
   obtaining, at an input/output (IO) device that comprises at least one offload module, information regarding a packet for transmission by the 10 device on an overlay network, wherein the packet is associated with an incomplete inner packet header, an incomplete outer overlay header, and a payload, and wherein obtaining comprises obtaining only the payload and the incomplete inner packet header with no outer overlay header; and
   independently performing offload operations on the incomplete inner packet header and the incomplete outer overlay header by:
      performing a first pass through the at least one offload module of the IO device to complete the inner packet header;
      performing a second pass through the at least one offload module of the IO device to generate the outer overlay header;
      separating the incomplete outer overlay header from the incomplete inner packet header and the payload before performing the first pass through the at least one offload module;
      after performing the first pass through the at least one offload module, returning the complete inner packet header and the payload to a receive queue; and
      pre-pending the incomplete outer overlay header to the complete inner packet header and the payload before performing the second pass through the at least one offload module of the IO device.

8. The non-transitory computer readable storage media of claim 7, wherein the instructions for obtaining comprise instructions for:
   adding the incomplete inner packet header and the incomplete outer overlay header to a single transmission queue of the IO device.

9. The non-transitory computer readable storage media of claim 7, further comprising instructions operable for:
   transmitting on the overlay network, the packet including a complete inner packet header, a complete outer overlay header and the payload.

10. The non-transitory computer readable storage media of claim 7, wherein the instructions for independently performing offload operations comprise instructions for:
   processing the incomplete inner packet header and the incomplete outer overlay header as independent entities by the IO device.

11. The non-transitory computer readable storage media of claim 7, wherein the instructions for obtaining comprise instructions for:

adding the incomplete inner packet header and outer overlay header to two separate transmission queues of the IO device.

12. The non-transitory computer readable storage media of claim 7, wherein the at least one offload module comprises first and second offload modules, and wherein the instructions operable for independently performing offload operations comprise instructions operable for:

performing, at the first and second offload modules, offload operations on both the inner packet header and the outer overlay header substantially in parallel to complete the inner packet header and the outer overlay header.

13. An input/output device comprising:

a processor;

a memory comprising at least one transmission queue configured to receive a packet for transmission on an overlay network, wherein the packet is associated with a payload, an incomplete inner packet header, and an incomplete outer overlay header, and wherein only the payload and the incomplete inner packet header are stored in the memory, without the outer overlay header;

at least one offload circuit configured to independently performing offload operations on the incomplete inner packet header and the incomplete outer overlay header by:

performing a first pass to complete the inner packet header; and performing a second pass to generate the outer overlay header, wherein only the incomplete inner packet header and the payload are provided to the at least one offload circuit for the first pass through the at least one offload circuit to complete the inner packet header, and wherein the payload, the complete inner packet header, and the incomplete overlay packet header are provided to the at least one offload circuit for the second pass through the at least one offload circuit to complete the outer overlay header; and an encapsulation/decapsulation circuit configured to separate the incomplete outer overlay header from the incomplete inner packet header and the payload before the first pass through the at least one offload circuit and to pre-pend the incomplete outer overlay header to the complete inner packet header and the payload before the second pass through the at least one offload circuit; and a forwarding circuit configured to transmit the packet including the completed inner packet header, the complete outer overlay header and the payload on the overlay network.

14. The input/output device of claim 13, wherein the memory comprises at least one receive queue configured to receive the packet, inner packet header offload data, and outer overlay header offload data.

15. The input/output device of claim 13, wherein the memory comprises a single transmission queue to store the incomplete inner packet header and the incomplete outer overlay header.

16. The input/output device of claim 13, wherein the memory comprises two separate transmission queues to store the incomplete inner packet header and the incomplete outer overlay header.

17. The input/output device of claim 13, wherein the at least one offload module comprises first and second offload circuits each configured to perform offload operations on both the inner packet header and the outer overlay header substantially in parallel to complete the inner packet header and the outer overlay header.

* * * * *